H. ANSTADT.
FRUIT AND VEGETABLE GRADER.
APPLICATION FILED MAR. 20, 1911.
1,002,211.
Patented Sept. 5, 1911.
2 SHEETS—SHEET 1.
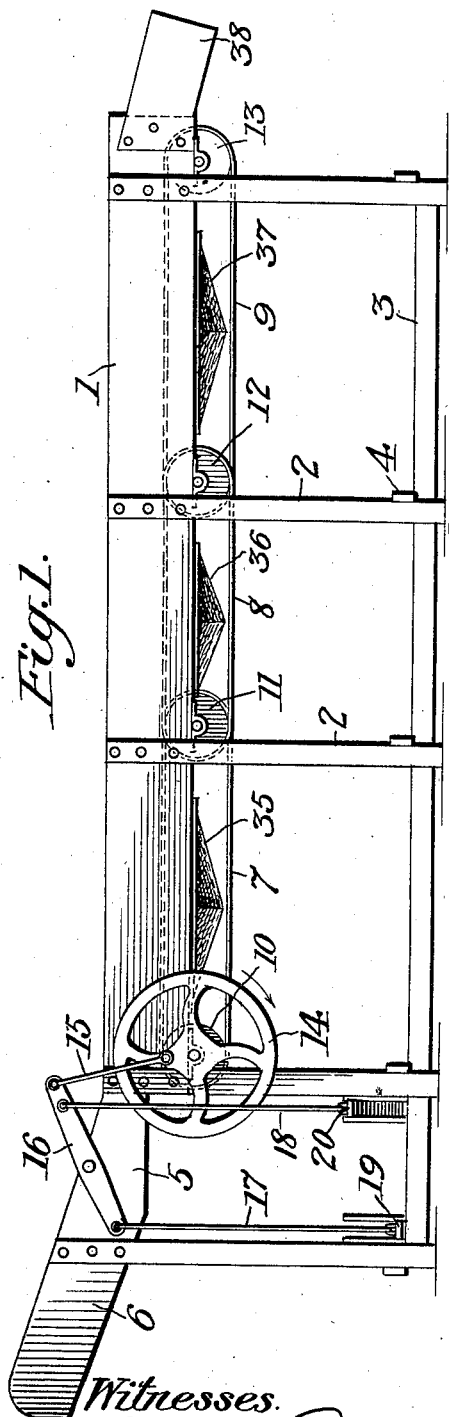
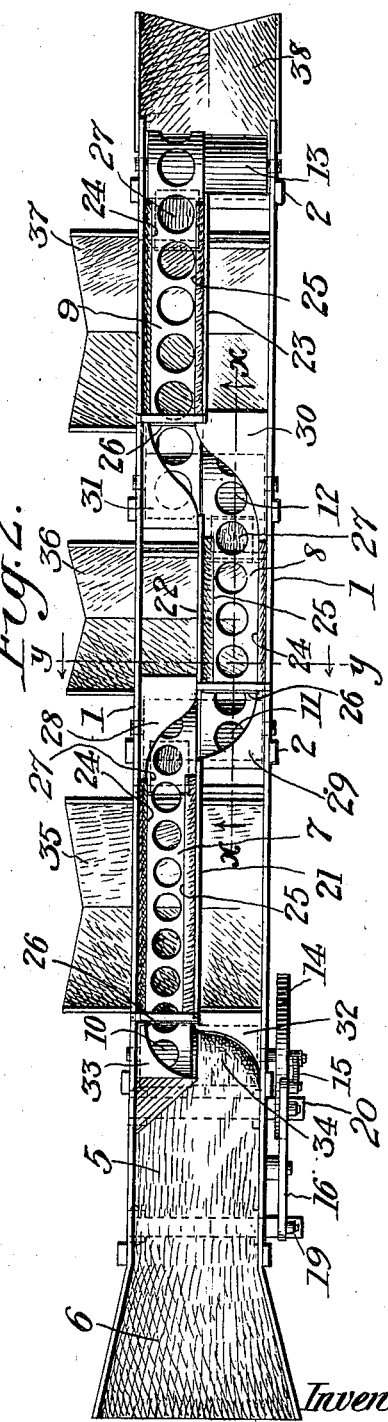
Witnesses.
Inventor.
Henry Anstadt H. ANSTADT.
FRUIT AND VEGETABLE GRADER.
APPLICATION FILED MAR. 20, 1911.
1,002,211.
Patented Sept. 5, 1911.
2 SHEETS—SHEET 2.
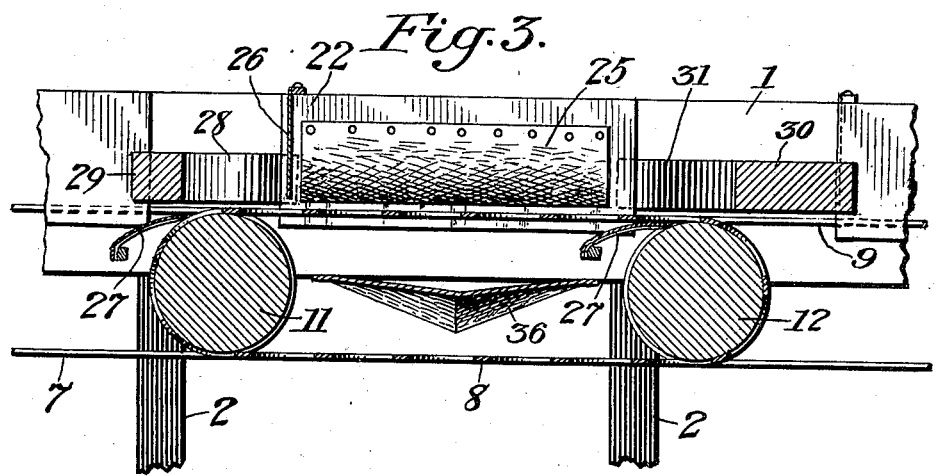
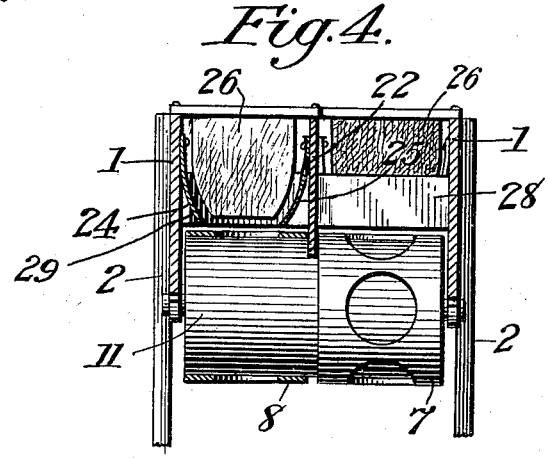
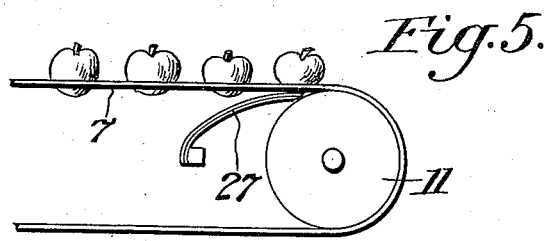
Witnesses.
Inventor.
Henry Anstadt
COLUMBIA PLANOGRAPH CO., WASHINGTON, D. C.

UNITED STATES PATENT OFFICE.

HENRY ANSTADT, OF GETTYSBURG, PENNSYLVANIA.

FRUIT AND VEGETABLE GRADER.

1,002,211.  Specification of Letters Patent.  Patented Sept. 5, 1911.

Application filed March 20, 1911. Serial No. 615,731.

*To all whom it may concern:*

Be it known that I, HENRY ANSTADT, a citizen of the United States, residing at Gettysburg, in the county of Adams and State of Pennsylvania, have invented a certain new and useful Improvement in Fruit and Vegetable Graders, of which the following is a full, clear, and exact description.

The object of this invention is to secure greater accuracy in grading fruits and vegetables, with greatly decreased, if not entire elimination of, exposure and liability to bruising the same.

A machine having carriers, such as belts with series of holes of progressively increasing size, has been devised, for grading or assorting substantially round fruits and vegetables, such as apples and tomatoes, in which the articles are moved from one series of holes to another in succession according to size, but such movement proceeds in straight lines throughout. I have obtained better results both in assorting or grading and in obviating bruising by laterally deflecting the several sizes from one belt to the next, and using a series of belts, each of the belts preferably having but a single size of holes, and the articles of larger sizes being diverted laterally from the belt having smaller holes to the belts having larger holes, successively or progressively, the largest articles escaping at the discharge end of the machine without the necessity of passing through a belt.

There has been difficulty in grading accurately fruit that is flat in shape, such as apples and tomatoes. Nearly all graders on the market are operated on the principle of graduated centerpiece and rollers or ropes or chains, the latter serving the double purpose of carying the fruit along and also of grading it by allowing the different sizes to drop through as the carriers separate farther and farther from the graduated centerpiece, or from each other if no stationary centerpiece is employed. Evidently this can be accurate only for fruit nearly or quite spherical in shape, such as oranges or peaches; apples, having a smaller diameter one way, are as likely as not to fall between the grading rollers with the smaller sizes of fruit, or falling with the larger diameter between the rollers they may be carried until they drop with the fruit of that size. The only method of accurately grading fruit of such shape, is by means of graduated circular holes through which it must drop and which catch it by its largest diameter no matter how it may fall upon the opening. Grading by this method is undoubtedly the most accurate possible for all fruit that is spherical, such as oranges and peaches, or flat, such as apples and tomatoes.

Machines have been invented employing the circular hole as the grading medium, but they have fallen short in one or more of the following requirements, which are essential: 1. Simplicity. For practical service a fruit grading machine must be simple in construction, so that it will not easily get out of order, but will be durable, and operate with a positive and reliable action. 2. Handling. The first requirement being met, the next, if not the primary consideration, is the method of handling the fruit. It must be handled with the utmost gentleness, so as absolutely to prevent bruising. 3. Speed. And finally, if the machine meets both of these tests, it has another which these help to render more difficult, namely, speed. Unless the work can be done much faster, as well as more accurately, than by hand, the grower or dealer will have no use for the machine. The machine of the present invention meets these requirements in a measure not heretofore obtained, so far as I am aware.

The invention consists of a machine for grading or assorting fruit, having a series of carriers, preferably endless belts mounted upon drums and provided with holes, said belts arranged end for end and successively out of line, with a lateral transfer arrangement by which the larger fruits are dislodged from holes through which they cannot or do not pass and moved over to the next succeeding belt having larger holes through which they may escape; provision being made for agitating the fruit as it is moved along through the machine; and all of the parts being of such material as to minimize if not quite eliminate liability to bruising, all as I will proceed now more particularly to describe and then claim.

By the term "fruit" I mean to include vegetables as well as fruits proper, and by the word "grading" or its derivatives or root, I mean to include all those acts variously described by that word and such words as "sorting," "assorting" and "separating."

In the accompanying drawings illustrating the invention, in the several figures of which like parts are similarly designated, Figure 1 is a side elevation. Fig. 2 is a top plan view. Fig. 3 is a longitudinal section, substantially on the line x—x, Fig. 2, looking in the direction of the arrow, of a portion of the machine drawn on a larger scale. Fig. 4 is a partial transverse section, substantially on the line y—y, Fig. 2, looking in the direction of the arrow. Fig. 5 is a diagrammatic view, illustrating the lifting feature.

The body may comprise side walls 1, upright supports 2 therefor, stringers 3, crosspieces 4, a sorting platform 5 of canvas or any other suitable material, and a feed-hopper 6 whose bottom likewise may be of canvas or of any other suitable or usual construction, including the well-known slatted construction to provide for the discharge of leaves and twigs.

In the construction shown, there are used three grading mediums, shown as endless belts, designated respectively 7, 8 and 9, and four drums 10, 11, 12 and 13, upon which these endless belts are mounted and by which they are given longitudinal movement. On the drum 10 is mounted a drive-wheel 14, connected by a pitman 15 with a lever 16 mounted on the frame, which lever is connected by rods 17 and 18 with treadles 19 and 20; although any other power may be used to drive the belts. One of the side walls 1 is used as the side wall of the trough for the belt 7, and a separate inner side wall 21 is arranged within the body to form the opposite side wall of the trough for this belt. The other side wall 1 is used as a side wall for the trough for the second belt 8, and a supplemental interior side wall 22 is provided to complete this trough. To form the trough for the third belt 9, the first mentioned side wall 1 is used and an internal supplemental side wall 23 is provided. Thus each belt has an independent trough to receive the fruit as it passes through or over the holes in that particular belt. So also, each belt has the guards 24 and 25 of canvas, rubber, or padded or other material sloping down from the side walls to insure that the fruit falls into and is carried along in the holes provided for grading, the edge of guard 24 being located away from the holes to permit these operations, and the edge of the guard 25 approaching closely to the holes in its respective trough, so as to agitate or turn the fruit and assist it in getting into position to drop through the holes in the belt, if of proper size, allowing it if too large to thus escape to move forward to the next belt or belts until it finds a hole through which it may escape.

Just in front of each trough is hung a canvas or other apron 26 which serves the purpose of pushing into a hole of the belt in the rear any fruit that might rest upon the belt between the holes and cause such fruit as might be small enough to pass through the holes in that belt to so drop. This apron yields to allow larger fruit when thus pushed back and settled in a hole of the belt to pass on to the next belt.

Beneath the upper surface of the belt and adjacent to the drums is arranged a lifting device 27, which curves up beneath the upper surface of the belt and serves to eject from the holes in that belt any fruit too large to pass through such holes and insure its being carried over to the next belt.

As shown, the intermediate or alternate belt 8 is out of line with the belts 7 and 9, and it therefore becomes necessary to provide for the transferring of the fruit from belt 7 to belt 8, and from belt 8 to belt 9, by a cross or lateral movement thereof; and to effect this, the outlet end of the trough of the first belt is stopped by a partition 28, of rubber, canvas, or other relatively soft or cushioning material, which has its counterpart 29 at the inlet end of the trough for belt 8, and so also the trough for the belt 8 has a corresponding but oppositely arranged partition 30 at its outlet, while the trough for the belt 9 has a complemental partition 31 at its inlet end.

I have found that by using a series of belts out of line, and having each belt with holes of uniform diameter and the holes in the successive belts of different diameter, and providing for the transfer of fruit from one belt to the other by a crosswise or lateral movement, there is insured a better feed of the fruit through the machine, and bruising the fruit is avoided. The fruit almost invariably settles in the holes, or is made to do so by means of the intercepting apron 26, and such fruit as does not pass through is properly ejected by the lifting device 27, and transferred from one belt to the other without violence. At the inlet end are the fruit diverting partitions 32 and 33 with a bottom 34 adjacent thereto for directing the fruit from the sorting table laterally onto the first grading belt. These partitions and bottoms are likewise of cushioning or soft material. Beneath the several belts are the laterally opening discharge pockets 35, 36 and 37, and at the end of the machine is a discharge pocket 38 which takes all of the largest fruit which fails to pass through the belt 9. Throughout the machine such material is used as will be least injurious to the fruit that comes into contact with it.

The operation will be readily understood, but may be summarized as follows:—First the fruit is allowed by the operator to roll down from the sorting table over the apron or bottom 34, where it is directed by the guard partitions 32, 33 into line with the holes of the first belt. The first apron 26 checks the fruit from being carried along by the belt, until it falls into one of the holes in the belt, and its position therein is made secure enough to insure its being carried along under and past the apron. Any fruit smaller than the holes will drop through and be caught by the discharge trough or pocket, but if larger, it will be carried along by the belt until it comes over the stationary lifting device 27, which will serve to gradually and gently lift the fruit up out of the hole even with the top of the belt, and when it is thus carried along a little farther, it will come into contact with the partitions or guides 28 and 29, which will deflect it across to the second belt; and so on throughout the machine. As the fruit passes through the respective troughs, the guard 25 on the side of each which runs along even with the circumference of the holes and assists in the accuracy of the grading, will serve to contact with fruit of uneven shape and that might pass through the holes of that belt were it properly positioned, and touches the fruit just enough to agitate it a little and change its position in the hole so as to permit it to escape, instead of carrying it on to the next belt and mingling with fruit of a larger size. It will be seen that the machine, when operated at a moderate speed, will present the grading holes successively to receive the fruit as rapidly as it can properly be sorted and passed on by the operator. The employment of a larger number of grading belts in the same series, each succeeding belt with holes of larger diameter, will provide for grading the fruit into a larger number of sizes, if desired.

The capacity of the machine can be increased by running a number of sets of belts, and furthermore, the parts may be duplicated in such way as to provide for sorting fruit into what is known as "fancy," (that is to say, fruit perfect in color and shape), and "choice," (that is to say, fruit which is slightly off color and irregular in shape). Of course, in this case, the operator will have to exercise judgment in diverting the two kinds of fruit to the proper grading belts, and a duplicate set of discharge pockets will be provided, opening on the opposite side of the machine. Any suitable arrangement may be provided for changing the belts so as to suit different varieties of fruit.

As already sufficiently indicated, the invention is susceptible of variations in its structure and the materials used.

What I claim is:—

1. In a machine for grading fruits and vegetables, a suitable frame, a series of successive grading mediums arranged out of line, and means to transfer laterally fruit of one size from one grading medium to the next successively until it finds its appropriate medium.

2. In a machine for grading fruits and vegetables, a suitable frame, a succession of movable grading mediums arranged out of line, and transversely arranged transfer mediums interposed between the grading mediums at their adjacent ends so as to divert the larger fruit from an inappropriate to an appropriate grading medium as the fruit progresses through the machine.

3. In a machine for grading fruits and vegetables, a suitable frame, a succession of grading mediums arranged out of line, means to move them in the same direction, means arranged transversely between the grading mediums at their adjacent ends to transfer the larger fruit from one medium to the next in succession in accordance with the size of the fruit, and intercepting devices arranged at the transfer points to turn back smaller fruit and permit the larger fruit to proceed.

4. In a machine for grading fruits and vegetables, a suitable frame, a succession of grading mediums arranged out of line, means to move them in the same direction, means arranged transversely between the grading mediums at their adjacent ends to transfer the larger fruit from one medium to the next in succession in accordance with the size of the fruit, means located adjacent to the transfer points to dislodge any fruit that may have become misplaced in the preceding grading medium and insure its passage to the next succeeding grading medium, and intercepting devices arranged at the transfer points to turn back smaller fruit and permit the larger fruit to proceed.

5. In a machine for grading fruits and vegetables, a suitable frame, a series of endless belts arranged end for end and successively out of line, drums on which the belts are mounted, and means to move said belts in the direction of their length, each belt having holes of substantially the same diameter and the holes in the successive belts being of increasing diameter.

6. In a machine for grading fruits and vegetables, a suitable frame, a series of endless belts arranged end for end and successively out of line, drums on which the belts are mounted, and means to move said belts in the direction of their length, each belt having holes of substantially the same diameter and the holes in the successive belts being of increasing diameter, combined with transferring means to deflect the larger of the fruit laterally from one belt to the next succeeding belt.

7. In a fruit and vegetable grader, the combination of a frame, a series of endless belts mounted therein and having holes of different diameter, all of the holes in each of the several belts being of the same diameter, drums in said frame on which the belts are arranged out of line and end for end, means to lift the fruit out of the holes through which it cannot pass, and means to transfer said fruit to the next succeeding belt having larger holes.

8. In a fruit and vegetable grader, the combination of a frame, endless belts arranged therein end for end and out of line successively, drums for supporting and moving said belts, each belt having its holes of uniform diameter, and the holes in the successive belts being of larger diameter, and guards arranged alongside of the holes and adapted to come into contact with the fruit to assist in its escape through or progress to a hole of the appropriate size.

9. In a fruit and vegetable grader, the combination of a frame, endless belts arranged therein and having grading holes, means to support and drive said belts, and stationary guards arranged lengthwise of the belts on opposite sides, the edge of one of the guards at each belt being located away from its grading holes and the edge of the other guard extending close to said grading holes so as to come into contact with the fruit lodging in any of said holes and turn it so as to present its least diameter to the hole and allow it to escape if of proper size or allow it to proceed if too large to escape.

In testimony whereof I have hereunto set my hand this 16th day of March A. D. 1911.

HENRY ANSTADT.

Witnesses:
  EDGAR L. DEARDUFF,
  W. L. MEALS.

---

Copies of this patent may be obtained for five cents each, by addressing the "Commissioner of Patents, Washington, D. C."